US010900826B2

(12) United States Patent
Kostic et al.

(10) Patent No.: US 10,900,826 B2
(45) Date of Patent: *Jan. 26, 2021

(54) PERSON SUPPORT APPARATUSES WITH LOAD CELLS AND MULTIPLE CALIBRATION DATA

(71) Applicant: Stryker Corporation, Kalamazoo, MI (US)

(72) Inventors: Marko N. Kostic, Johnson City, TN (US); Michael Joseph Hayes, Kalamazoo, MI (US); Daniel Vincent Brosnan, Kalamazoo, MI (US); Aaron Douglas Furman, Kalamazoo, MI (US); Jason A. Vanderplas, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/364,658

(22) Filed: Mar. 26, 2019

(65) Prior Publication Data

US 2019/0219438 A1    Jul. 18, 2019

Related U.S. Application Data

(63) Continuation of application No. 15/185,623, filed on Jun. 17, 2016, now Pat. No. 10,260,933.

(60) Provisional application No. 62/186,464, filed on Jun. 30, 2015.

(51) Int. Cl.
*G01G 19/44* (2006.01)
*G01G 23/01* (2006.01)

(52) U.S. Cl.
CPC .......... *G01G 19/445* (2013.01); *G01G 23/01* (2013.01)

(58) Field of Classification Search
CPC ........................... G01G 19/445; G01G 23/01
See application file for complete search history.

(56) References Cited

U.S. PATENT DOCUMENTS

| 5,606,516 | A  | * | 2/1997 | Douglas | G01G 5/003 |
| | | | | | 177/208 |
| 7,211,748 | B2 | * | 5/2007 | Lauke | G01G 3/147 |
| | | | | | 177/199 |
| 10,330,522 | B2 | * | 6/2019 | Paul | G01G 19/44 |

(Continued)

*Primary Examiner* — Natalie Huls
(74) *Attorney, Agent, or Firm* — Warner Norcross + Judd LLP

(57) ABSTRACT

A person support apparatus, such as a bed, stretcher, recliner, cot, or the like, includes a frame, a plurality of load cells, a support surface supported by the load cells, a detection circuit, and a controller. The controller determines if any of the load cells are in an error state based upon information from the detection circuit. If the load cells include memory having calibration data stored therein, the controller communicates with the memory and uses the calibration data to determine an amount of weight supported on the surface. The detection circuit may include one or more Wheatstone bridges wherein the controller monitors voltages between midpoints of the Wheatstone bridges. The load cells may include an activation lead that is monitored by the detection circuit and a sensor lead that is used by the controller to determine an amount of weight supported on the patient support apparatus.

20 Claims, 8 Drawing Sheets

(56) References Cited

U.S. PATENT DOCUMENTS

| | | | | |
|---|---|---|---|---|
| 2002/0029911 A1* | 3/2002 | Richards | ............. | G01G 19/445 177/144 |
| 2005/0172405 A1* | 8/2005 | Menkedick | ............ | A61G 7/005 5/618 |
| 2007/0164871 A1* | 7/2007 | Dionne | ................. | A61G 7/015 340/573.1 |
| 2016/0236902 A1* | 8/2016 | Gonz lez Gallegos | ...................... | G01G 19/14 |
| 2016/0327426 A1* | 11/2016 | Nachtigal | ............ | A61G 7/0527 |
| 2017/0234723 A1* | 8/2017 | Charles | ................ | A61B 5/1036 5/600 |
| 2018/0146906 A1* | 5/2018 | Harmeyer | ............ | A61B 5/4809 |

* cited by examiner

PERSON SUPPORT APPARATUSES WITH LOAD CELLS AND MULTIPLE CALIBRATION DATA

CROSS-REFERENCE TO RELATED APPLICATIONS

This application claims priority to U.S. patent application Ser. No. 15/185,623 filed Jun. 17, 2016, by inventors Marko Kostic et al. and entitled PERSON SUPPORT APPARATUSES WITH LOAD CELLS, which claims priority to U.S. provisional patent application Ser. No. 62/186,464 filed Jun. 30, 2015, by inventors Marko Kostic et al. and entitled PERSON SUPPORT APPARATUSES WITH LOAD CELLS, the complete disclosures of both of which are hereby incorporated herein by reference.

BACKGROUND

The present disclosure relates to person support apparatuses, such as beds, cots, stretchers, operating tables, recliners, or the like. More specifically, the present disclosure relates to person support apparatuses that include load cells.

Existing hospital beds and/or stretchers often include a load cell system that is used to detect the weight of an occupant of the bed or stretcher, and/or that is used as an exit detection system. When functioning as a scale system, the outputs of the load cells are read and a weight of the occupant is detected. When functioning as an exit detection system, the outputs of the load cells are read and used to detect when a patient has exited the bed or stretcher, or when a patient may be about to exit the bed or stretcher.

Often, conventional load cell systems include a processor or microcontroller that monitors the outputs of the load cells and detects an error state if one or more of the load cells report force values that are outside of an expected range. For example, if an individual load cell is designed in the person support apparatus to sense weights between 0 and 500 pounds, and that load cell outputs a voltage corresponding to 700 pounds, the processor or microcontroller interprets this as an error state.

SUMMARY

According to various embodiments, the present disclosure provides a person support apparatus having an improved load cell system that is configured to better detect error states of the load cells. In some embodiments, the detected error states are due to the load cell not being electrically connected, or improperly connected, to the processor or microcontroller that reads the outputs of the load cells. In some embodiments, the improved load cell system is also or alternatively adapted to automatically detect error states relating to an activation voltage source that supplies power to the load cells. The automatic error state detection of the improved load cell system is better able to detect error states of the load cells than previous load cell systems. Further, in some embodiments, the load cells are configured to include load cell-specific and/or person support apparatus-specific calibration data in a memory integrated into the load cells. This stored calibration data enables a defective load cell to be replaced without requiring recalibration of the replacement load cell after it is installed in the person support apparatus.

According to one embodiment, a person support apparatus is provided that includes a frame, a plurality of load cells, a support surface, a detection circuit, and a controller. The load cells are supported by the frame, and the support surface is supported by the load cells such that a weight of the occupant is detectable by the load cells when the occupant is positioned on the support surface. The detection circuit is in communication with the load cells, and the controller is in communication with the detection circuit. The controller determines if any of the plurality of load cells are in an error state based upon information from the detection circuit, and outputs an error signal if one or more of the plurality of load cells are in the error state.

The error state may comprise one or more of the plurality of load cells not being electrically coupled to an activation power source, or it may comprise one or more of the load cells malfunctioning while the load cells are electrically coupled to the activation power source.

In some embodiments, each load cell includes a first set of leads for powering the load cell and a second set of leads for outputting a signal that varies as a function of a physical load applied to the load cell. The detection circuit is in electrical communication with the first set of leads but not the second set of leads. The detection circuit detects changes in a total amount of electrical current supplied to all of the first sets of leads from the activation power source. Further, the controller determines that one or more of the plurality of load cells are not electrically coupled to the activation power source, or are otherwise malfunctioning, if the total amount of electrical current supplied to all of the first sets of leads is outside of a predetermined range. The predetermined range may be a function of the number of load cells in the plurality of load cells, as well as a function of the type of load cells. The predetermined range has a magnitude greater than a magnitude of an expected change in the current supplied to the first set of leads when no load is applied to the load cells and when a maximum rated load is applied to the load cells.

The detection circuit, in some embodiments, identifies individual ones of the plurality of load cells that are present and either malfunctioning or functioning correctly. The controller identifies an individual one of the plurality of load cells as being present and functioning normally if an amount of electrical current supplied to the first set of leads to the individual one of the plurality of load cells falls within a predetermined range.

The detection circuit also includes, in some embodiments, a plurality of switches controlled by the controller. The switches are arranged in series with one or more of the plurality of load cells.

In some embodiments, a user interface is provided that is adapted to allow a user to inform the controller when no load is supported on the support surface. The controller opens or closes at least one of the switches when no load is supported on the support surface. The controller uses the opening and closing of at least one of the switches to distinguish between one or more of the load cells being absent (and/or malfunctioning) and an improper activation voltage being applied to the plurality of load cells from the activation power source.

The controller communicates with the second set of leads of each of the plurality of load cells and the controller determines an amount of weight applied to the support surface based upon voltage changes in the second set of leads of each of the plurality of load cells, in some embodiments.

According to another embodiment, a person support apparatus is provided that includes a frame, first and second load cells supported by the frame, a support surface, first and second activation leads, first and second sensor leads, an activation voltage source, a controller, and a detection circuit. The support surface is adapted to support thereon an occupant of the person support apparatus, and it is supported by at least the first and second load cells such that a weight of the occupant is at least partially detectable by the first and second load cells when the occupant is positioned on the support surface. The first and second activation leads are coupled to the first and second load cells, respectively. The first and second sensor leads are also coupled to the first and second load cells, respectively. The activation voltage source is adapted to provide a substantially constant voltage to the first and second activation leads. The controller determines an amount of weight applied to the support surface based on voltage changes in the first and second sensor leads. The detection circuit communicates with the activation voltage source, the first and second activation leads, and the controller; and the controller is adapted to detect if the first load cell is in an error state based upon information from the detection circuit.

The error state includes an electrical disconnection of the first load cell from the controller, as well as the malfunctioning of the first load cell while electrically connected.

In some embodiments, the controller monitors a total amount of electrical current flowing from the activation voltage source to the first and second activation leads. The controller determines that the first load cell is in an error state if the total amount of electrical current flowing from the activation voltage source to the first and second activation leads moves outside of a predetermined range.

The detection circuit includes a first switch in series with the first load cell and a second switch in series with the second load cell, in at least some embodiments. The controller controls the first and second switches to distinguish between the first load cell being in the error state and the second load cell being in the error state. In other embodiments, the controller uses the first and second switches to distinguish between the first load cell being in an error state and the activation voltage source being in an error state. The error state of the activation voltage source includes a substantially non-constant voltage being supplied by the activation voltage source to the first and second activation leads, or a substantially constant voltage having an incorrect value being supplied by the activation voltage source.

In some embodiments, the first load cell includes a first Wheatstone bridge, the second load cell includes a second Wheatstone bridge, and the first and second Wheatstone bridges are part of a third Wheatstone bridge. When so arranged, the controller monitors a voltage between midpoints of the third Wheatstone bridge when no load is supported on the support surface, and the controller issues an error signal if the voltage between midpoints of the third Wheatstone bridge exceeds a threshold level when no load is supported on the support surface.

In still other embodiments, the controller stores first calibration data for the first load cell and second calibration data for the second load cell in a memory on board the person support apparatus. The first calibration data includes a first subset of calibration data generated before the first load cell is installed in the person support apparatus and a second subset of calibration data generated after the first load cell is installed in the person support apparatus. The second calibration data includes a third subset of calibration data generated before the second load cell is installed in the person support apparatus and a fourth subset of calibration data generated after the second load cell is installed in the person support apparatus.

The controller is further adapted to use the second subset of calibration data when a replacement load cell is installed in the person support apparatus, wherein the replacement load cell replaces the first load cell. The controller uses the second subset of calibration data to calibrate the replacement load cell. The controller calibrates the replacement load cell without requiring any calibration measurements to be taken regarding the replacement load cell after the replacement load cell is installed in the person support apparatus.

In some embodiments, the first subset of calibration data is stored in a first memory physically coupled to the first load cell and the third subset of calibration data is stored in a second memory physically coupled to the second load cell. The controller reads the first and third subsets of calibration data from the first and second memories, respectively, and stores them in the memory on board the person support apparatus.

According to another embodiment, a person support apparatus is provided that includes a frame, first and second load cells, a support surface, and a controller. The first and second load cells are supported by the frame and include first and second Wheatstone bridges, respectively. The first and second Wheatstone bridges are arranged as part of a third Wheatstone bridge. The support surface is supported by at least the first and second load cells such that a weight of the occupant is at least partially detectable by the first and second load cells when the occupant is positioned on the support surface. The controller communicates with the first, second, and third Wheatstone bridges and is adapted to monitor voltages between midpoints of each of the first, second, and third Wheatstone bridges.

The controller uses the voltage between the midpoints of the first Wheatstone bridge and the voltage between the midpoints of the second Wheatstone bridge to determine an amount of weight applied to the support surface. The controller uses the voltage between the midpoints of the third Wheatstone bridge to determine if an error state exists for at least one of the first and second load cells. In some embodiments, the controller also, or alternatively, uses the voltage between the midpoints of the third Wheatstone bridge to determine if an error state exists for at least one of the first and second load cells when no load is supported on the support surface.

The person support apparatus may also include a detection circuit in electrical communication with the first and second load cells and the controller, wherein the controller is further adapted to determine if an error state exists for at least one of the first and second load cells based upon information from the detection circuit. An activation voltage source may be coupled to endpoints of the first and second Wheatstone bridges, wherein the detection circuit monitors a total amount of electrical current flowing from the activation voltage source to the endpoints of the first and second Wheatstone bridges. The controller determines that at least one of the first and second load cells is in an error state if the total amount of electrical current flowing from the activation voltage source to the endpoints moves outside of a predetermined range.

According to yet another embodiment, a person support apparatus is provided that includes a frame, a support surface, a load cell memory, a person support apparatus memory, and a controller. The support surface is supported by the load cell such that a weight of the occupant is at least partially detectable by the load cell when the occupant is positioned on the support surface. The load cell memory is integrated within the load cell and includes first calibration data regarding the load cell stored therein. The first calibration data is generated before the load cell is installed in the person support apparatus. The person support apparatus memory contains second calibration data regarding the load cell that is generated after the load cell is installed in the person support apparatus. The controller communicates with the load cell, the load cell memory, and the person support apparatus memory. The controller uses the first calibration data and the second calibration data to determine an amount of weight applied to the support surface The controller uses the second calibration data to calibrate a replacement load cell when the replacement load cell is installed in the person support apparatus that replaces the load cell. The controller does not use the first calibration data when the replacement load cell is installed in the person support apparatus. The controller may also calibrate the replacement load cell without requiring any calibration measurements to be taken regarding the replacement load cell after the replacement load cell is installed in the person support apparatus.

According to yet another embodiment, a person support apparatus is provided that includes a frame, a plurality of sensors supported by the frame, a structure supported by the sensors, a detection circuit, and a controller. The structure is supported by the sensors in such a way that the sensors are able to detect a force exerted on the structure by a person. The detection circuit is in communication with the sensors and the controller is in communication with the detection circuit. The controller determines if any of the plurality of sensors are in an error state based upon information from the detection circuit.

In some embodiments, the sensors are load cells.

According to yet another embodiment, a person support apparatus is provided that includes a frame, first and second sensors support by the frame, a structure, and a controller. The first and second sensors are included within first and second Wheatstone bridges, respectively, and the first and second Wheatstone bridges are included within a third Wheatstone bridge. The structure is supported by the first and second sensors in such a way that the first and second sensors are able to detect a force exerted on the structure by a person. The controller communicates with the first, second, and third Wheatstone bridges, and is adapted to monitor voltages between midpoints of each of the first, second, and third Wheatstone bridges.

The controller uses the voltage between the midpoints of the first Wheatstone bridge and the voltage between the midpoints of the second Wheatstone bridge to determine a magnitude of the force exerted on the structure, and the controller uses the voltage between the midpoints of the third Wheatstone bridge to determine if an error state exists for at least one of the first and second sensors.

In any of the person support apparatuses described herein, the person support apparatus may be one of a bed, a recliner, a cot, and a stretcher. Further, in some embodiments, at least one of the load cells is used to detect a user-applied force that is used by the controller to control a propulsion system on-board the person support apparatus.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
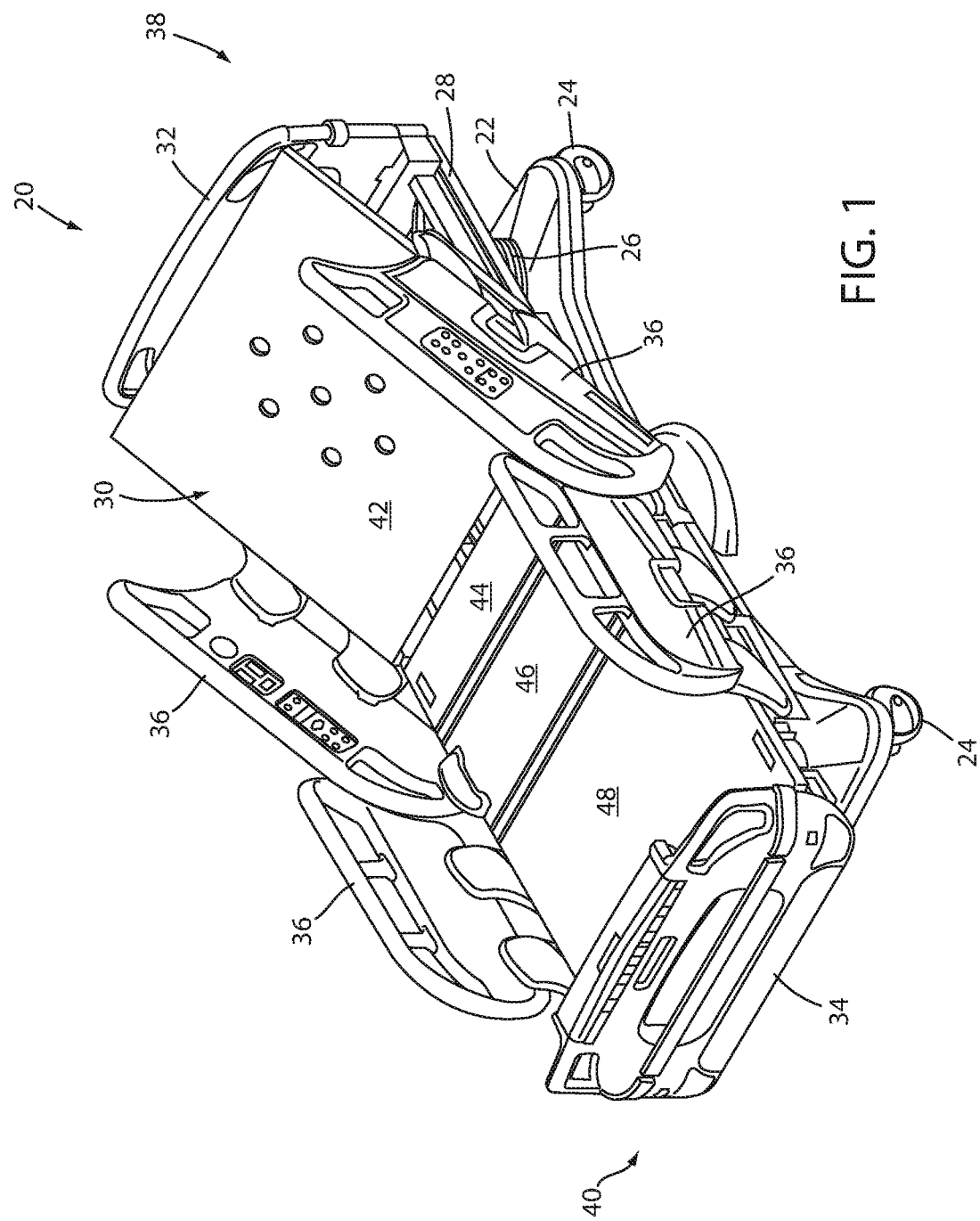
FIG. 1 is a perspective view of a person support apparatus according to a first embodiment.

An illustrative person support apparatus 20 according to a first embodiment is shown in FIG. 1. Although the particular form of person support apparatus 20 illustrated in FIG. 1 is a bed adapted for use in a hospital or other medical setting, it will be understood that person support apparatus 20 could, in different embodiments, be a cot, a stretcher, a gurney, a recliner, an operating table, a residential bed, or any other structure capable of supporting a person, whether stationary or mobile and/or whether medical or residential.

In general, person support apparatus 20 includes a base 22 having a plurality of wheels 24, a pair of lifts 26 supported on the base, a litter frame 28 supported on the lifts 26, and a support deck 30 supported on the litter frame 28. Person support apparatus 20 further includes a headboard 32, a footboard 34, and a plurality of siderails 36. Siderails 36 are all shown in a raised position in FIG. 1 but are each individually movable to a lower position in which ingress into, and egress out of, person support apparatus 20 is not obstructed by the lowered siderails 36.

Lifts 26 are adapted to raise and lower litter frame 28 with respect to base 22. Lifts 26 may be hydraulic actuators, electric actuators, or any other suitable device for raising and lowering litter frame 28 with respect to base 22. In the illustrated embodiment, lifts 26 are operable independently so that the tilting of litter frame 28 with respect to base 22 can also be adjusted. That is, litter frame 28 includes a head end 38 and a foot end 40, each of whose height can be independently adjusted by the nearest lift 26. Person support apparatus 20 is designed so that when an occupant lies thereon, his or her head will be positioned adjacent head end 38 and his or her feet will be positioned adjacent foot end 40.

Litter frame 28 provides a structure for supporting support deck 30, headboard 32, footboard 34, and siderails 36. Support deck 30 provides a support surface for a mattress (not shown in FIG. 1), or other soft cushion, so that a person may lie and/or sit thereon. The top surface of the mattress or other cushion forms a support surface for the occupant. Support deck 30 is made of a plurality of sections, some of which are pivotable about generally horizontal pivot axes. In the embodiment shown in FIG. 1, support deck 30 includes a head section 42, a seat section 44, a thigh section 46, and a foot section 48. Head section 42, which is also sometimes referred to as a Fowler section, is pivotable about a generally horizontal pivot axis between a generally horizontal orientation (not shown in FIG. 1) and a plurality of raised positions (one of which is shown in FIG. 1). Thigh section 46 and foot section 48 may also be pivotable about generally horizontal pivot axes.

Figure 2:
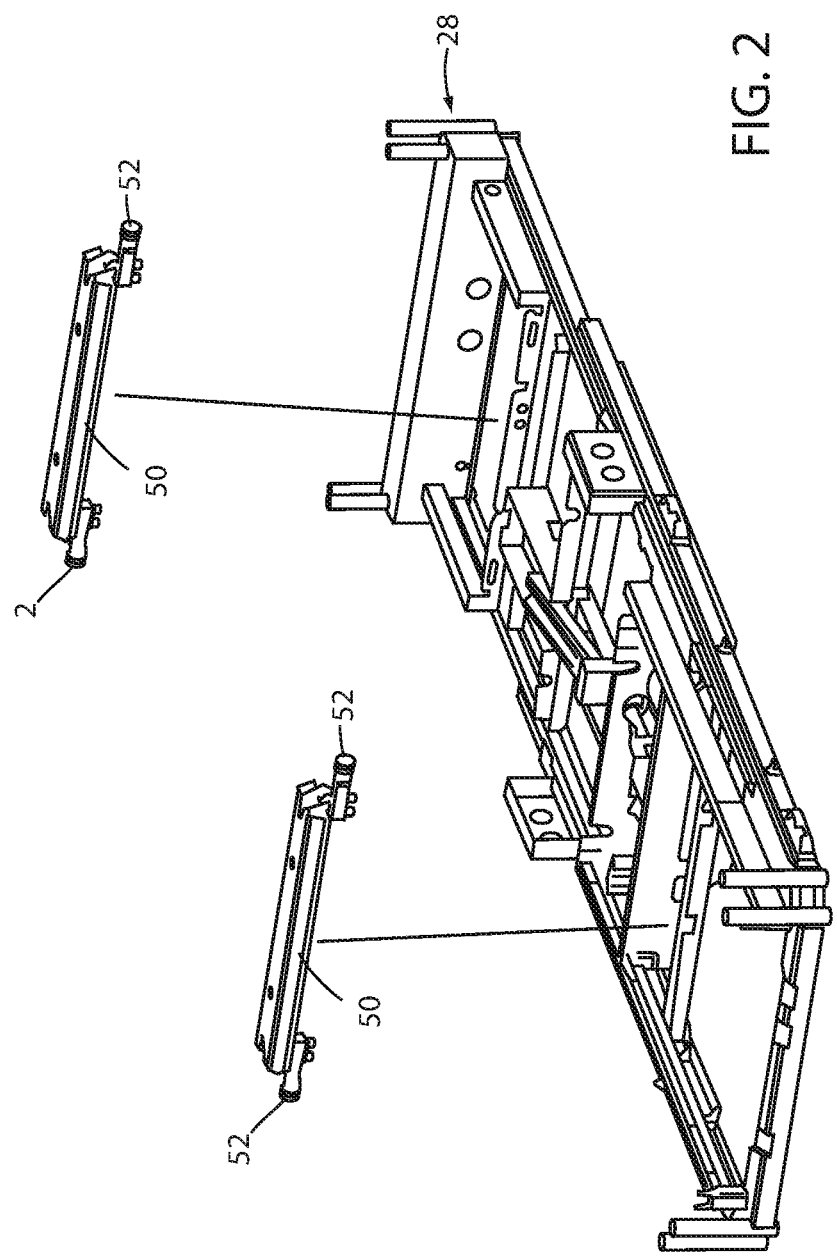
FIG. 2 is a perspective view of a litter and a pair of lift header assemblies with load cells of the person support apparatus of FIG. 1.

FIG. 2 illustrates in greater detail litter frame 28 separated from lifts 26 and base 22. Litter frame 28 is also shown in FIG. 2 with support deck 30 removed. Litter frame 28 is supported by two lift header assemblies 50. A first one of the lift header assemblies 50 is coupled to a top of a first one of the lifts 26, and a second one of the lift header assemblies 50 is coupled to the top of the second one of the lifts 26. Each lift header assembly 50 includes a pair of load cells 52. The illustrated embodiment of person support apparatus 20 therefore includes a total of four load cells 52, although it will be understood by those skilled in the art that different numbers of load cells may be used in accordance with the principles of the present disclosure. Load cells 52 are configured to support litter frame 28. More specifically, load cells 52 are configured such that they provide complete and exclusive mechanical support for litter frame 28 and all of the components that are supported on litter frame 28 (e.g. support deck 30, headboard 32, footboard 34, siderails 36, etc.). Because of this construction, load cells 52 are adapted to detect the weight of not only those components of person support apparatus 20 that are supported by litter frame 28 (including litter frame 28 itself), but also any objects or persons who are wholly or partially being supported by support deck 30.

The mechanical construction of person support apparatus 20, as shown in FIGS. 1 and 2, is the same as, or nearly the same as, the mechanical construction of the Model 3002 S3 bed manufactured and sold by Stryker Corporation of Kalamazoo, Mich. This mechanical construction is described in greater detail in the Stryker Maintenance Manual for the MedSurg Bed, Model 3002 S3, published in 2010 by Stryker Corporation of Kalamazoo, Mich., the complete disclosure of which is incorporated herein by reference. It will be understood by those skilled in the art that person support apparatus 20 can be designed with other types of mechanical constructions, such as, but not limited to, those described in commonly assigned, U.S. Pat. No. 7,690,059 issued to Lemire et al., and entitled HOSPITAL BED; and/or commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosures of both of which are also hereby incorporated herein by reference. The mechanical construction of person support apparatus 20 may also take on forms different from what is disclosed in the aforementioned references.

Figure 3:
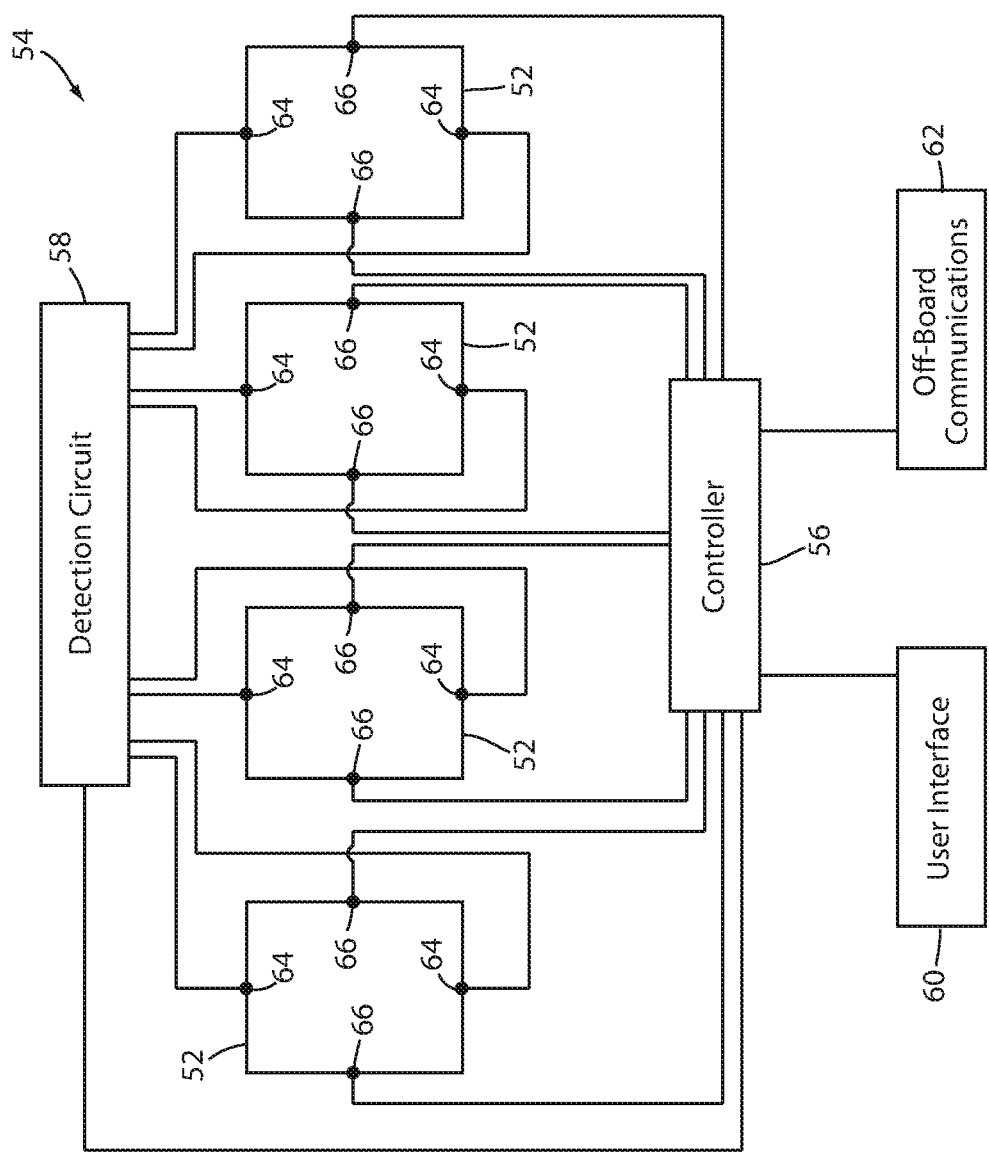
FIG. 3 is a block diagram of a load cell system that may be incorporated into the person support apparatus of FIG. 1, as well as other person support apparatuses.

Load cells 52 are part of a load cell system 54 (FIG. 3). Load cell system 54 includes, in addition to load cells 52, a controller 56, a detection circuit 58, a user interface 60, and an off-board communication module 62. Load cell system 54 functions as a scale system and/or as an exit detection system. When functioning as a scale system, load cell system 54 is adapted to measure the amount of weight that is supported on litter frame 28. Through the use of a tare control on user interface 60, the weight of the litter frame 28 and other components of the person support apparatus 20 can be separated from the weight reading such that a weight of just the occupant of person support apparatus 20 can be determined.

When load cell system 54 functions as an exit detection system, load cell system 54 is adapted to determine when an occupant of person support apparatus 20 has left, or is likely to leave, person support apparatus 20, and to issue an alert and/or notification to appropriate personnel so that proper steps can be taken in response to the occupant's departure (or imminent departure) in a timely fashion. In at least one embodiment, load cell system 54 acts as an exit detection system by monitoring the center of gravity of the patient using the system and method disclosed in commonly assigned U.S. Pat. No. 5,276,432 issued to Travis and entitled PATIENT EXIT DETECTION MECHANISM FOR HOSPITAL BED, the complete disclosure of which is incorporated herein by reference. Other manners for functioning as an exit detection system are also possible. Further, in some embodiments, load cell system 54 functions both as an exit detection system and as a scale system.

Controller 56 is in communication with detection circuit 58 and each load cell 52 (FIG. 3). Controller 56 is adapted to read the outputs from each load cell 52 and determine, based on the combination of outputs, the total weight or load that is being supported on litter frame 28. In addition, controller 56 is adapted to maintain and utilize a tare weight so that the weight of the occupant of person support apparatus 20 can be distinguished from the weight of the components of person support apparatus 20 and other non-patient items (e.g. bedding, pillows, etc.). In at least one embodiment, controller 56 is a microcontroller. It will be understood, however, the controller 56 may take on other forms. In general, controller 56 may include any one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by controller 56 in carrying out the functions described herein, as well as the data necessary for carrying out these functions, are stored in memory (not labeled) accessible to controller 56.

Controller 56, in addition to monitoring the outputs of load cells 52, may also may control other aspects of person support apparatus 20 (e.g. motion), or controller 56 may be in communication with one or more other controllers that control the other aspects of person support apparatus 20.

Off-board communications module 62 includes one or more transceivers that communicate with one or more off-board devices. In one embodiment, module 62 includes a WiFi radio adapted to communicate with wireless access points of a healthcare facility's computer network, thereby enabling the person support apparatus 20 to communicate wirelessly with the computer network of the healthcare facility. Module 62 may also include an Ethernet connection, or other wired circuitry, for enabling wired communication with the hospital network, as well as nurse call cable circuitry for coupling to a nurse call cable that communicates with a nurse call system.

Detection circuit 58 is adapted to supply a substantially constant activation voltage to load cells 52. Detection circuit 58 is also adapted to perform one or both of the following two additional functions: (1) detecting whether one or more of the load cells 52 are in an error state (e.g. they are not present, are not electrically coupled to load cell system 54 properly, and/or are malfunctioning); and (2) detecting whether there are problems with the activation voltage supplied to load cells 52. In carrying out either or both of these functions, detection circuit 58 notifies controller 56 if it has detected an error with load cells 52 and/or an error with respect to the activation voltage supplied to load cells 52. Controller 56, in response, sends a message to user interface 60 and/or off-board communication module 62 indicating that an error has been detected. User interface 60 and/or the remote device in communication with module 62 then alerts appropriate personnel in an audio, visual, and/or audiovisual manner.

Each load cell 52 includes a pair of activation leads 64 and a pair of sensing or sensor leads 66 (FIG. 3). Detection circuit 58 is in electrical communication with activation leads 64, but not with sensor leads 66. Controller 56, in contrast, is in electrical communication with sensor leads 66, but not activation leads 64. One of each pair of the activation leads 64 of each load cell 52 is coupled to an activation voltage source 68 (FIG. 4), which supplies electrical power to the load cell 52, and the other of each pair of the activation leads 64 is coupled to ground. Sensor leads 66, rather than supplying electrical power, provide outputs to controller 56 that are used to determine how much force is being exerted on load cells 52. That is, sensor leads 66 provide outputs that are correlated to the forces sensed by load cells 52. In summary, activation leads 64 provide power for the load cells 52 while sensors leads 66 provide outputs that are indicative of the force applied against load cells 52.

Although not shown in FIG. 3, load cells 52 are typically configured as Wheatstone bridges wherein the one or more strain gauges that are internal to the load cell are arranged in one or more legs of the Wheatstone bridge. The other legs consist of known resistances. In other words, as shown in FIGS. 4-9, one of the strain gauges is effectively responsible for one of the resistance values 76*a-d*. (In some load cells, strain gauges are positioned in more than one leg of the Wheatstone bridge, but the strain gauges are geometrically arranged within the load cell to sense the same magnitude, but not necessarily direction, of the applied force). Typically, when no forces are detected by the strain gauges of the load cell 52, the current flowing through each of the two paths of the Wheatstone bridge is balanced, and there is substantially no voltage drop between the two midpoints. However, when a force is detected, the current is no longer balanced, and a voltage is detected between the two midpoints. The two midpoints correspond to the sensor leads 66 while the two activation leads 64 correspond to the endpoints of the Wheatstone bridge. This can be seen more clearly in FIGS. 4-9, which show the internal Wheatstone bridge configuration of the load cells 52 and the locations of activation and sensing leads 64 and 66.

FIGS. 4-9 illustrate six different manners in which detection circuit 58 can be used to detect an error state with respect to one or more load cells 52 and/or an error state with the activation voltage supplied to the load cells 52. These six different manners of implementing detection circuit 58 will be referenced as detection circuits 58*a-f*, respectively. In some of these embodiments, detection circuit 58 only checks for error states in the load cells 52, while in others of these embodiments, detection circuit 58 checks for both error states with the load cells and with the activation voltage source, as will now be discussed in greater detail below.

Figure 4:
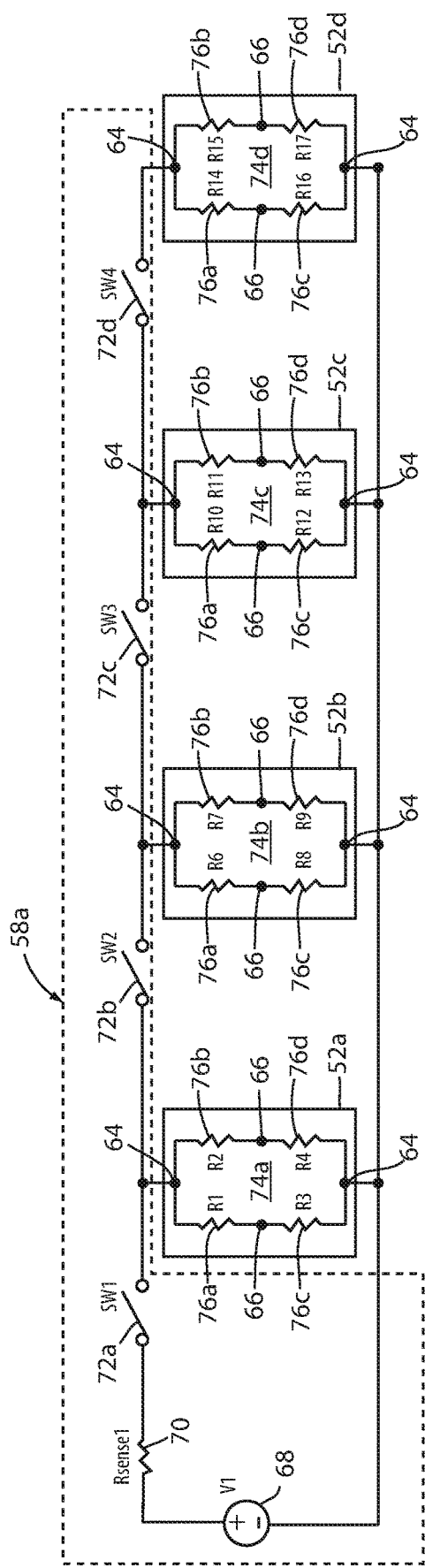
FIG. 4 is a block diagram of a first embodiment of a detection circuit that may be used with the load cell system of FIG. 3.

Detection circuit 58*a* of FIG. 4 is adapted to detect the presence or absence of each load cell, as well as the status of each load cell 52 that is present. A load cell is considered "absent" if it is physically not part of person support apparatus 20, if it is attached to person support apparatus 20 but not electrically integrated with detection circuit 58*a* and/or controller 56, or if it is attached to person support apparatus 20 and electrically integrated, but not electrically integrated in a complete or proper manner. Additionally, not only is detection circuit 58*a* adapted to detect if there is an error state with respect to a load cell (e.g. the load cell is absent or malfunctioning), but it is also adapted to identify which specific one (or ones) of the load cell is in the error state, and to report that identification to controller 56.

Detection circuit 58*a* includes an activation voltage source 68, a sense resistor 70, and four switches 72*a-d*. Sense resistor is used to measure the amount of electrical current that is flowing out of activation voltage source 68 and to load cells 52. That is, circuitry (not shown) is coupled to sense resistor 70 that measures the amount of current flowing through it and reports this measured current amount to controller 56. As can be seen in FIG. 4, sense resistor is arranged in series with each of the load cells 52.

Each switch 72*a-d* is an electronically controlled switch (such as, for example, a Metal Oxide Semiconducting Field Effect Transistor: MOSFET), that is opened and closed by controller 56. As shown in FIG. 4, each switch 72*a-d* is arranged in series with each other such that, when all of the switches 72*a-d* are closed, electrical current from activation voltage source 68 is supplied to all of the load cells 52. In contrast, when all of the switches 72*a-d* are open, no electrical current flows to any of the load cells 52, nor through sense resistor 70. If switch 72*a* is closed, but the three other switches are open, electrical current is supplied to only the first load cell 52*a*, but not to the other load cells 52*b-d*.

During normal operation of the load cell system, all four of the switches 72*a-d* are closed so that electrical current is supplied to all four load cells 52*a-d*, thereby allowing force readings to be read from each load cell 52*a-d* (via sensor leads 66). Also during normal operation, the amount of current flowing through sense resistor 70 is monitored by controller 56. As will be discussed in greater detail below, if the amount of current flowing through sense resistor 70 is outside of a predefined range, this is indicative of an error state with respect to one or more load cells 52*a-d* and/or with respect to activation voltage source 68. If controller 56 determines that the current through sense resistor 70 is outside of this range, controller 56 selectively opens and closes switches 72a-d of detection circuit 58a in order to determine which specific one (or ones) of load cells 52a-d are in the error state, as will also be discussed more below.

Before turning to the detailed manner in which detection circuit 58a is used to determine error states of load cells 52 and/or activation voltage source 68, it will be helpful to explain the operation of the load cell system when no error states exist. During normal operation (e.g. no error states), the amount of electrical current that flows through each load cell 52 (and also through sense resistor 70) is substantially constant. As will be discussed, some minor variations occur in response to different amounts of weights that are detected by the load cell system, but these variations are orders of magnitude smaller than the current variations that normally occur when a load cell 52 is absent, unplugged, malfunctioning, or in some other type of error state. Controller 56 therefore ignores these minor changes in the current through sense resistor 70 that are due to changing forces applied to the load cells, and instead monitors whether or not more substantial changes in the current through sense resistor 70 occur. Only if such substantial current changes occur does controller 56 determine that an error state occurs.

The relatively constant amount current that is expected to flow through sense resistor 70 during normal operation is calculated during the design of person support apparatus 20. This value (herein "the normal current value") is calculated based upon the voltage of activation voltage source 68, the size of sense resistor 70, and the amount of electrical resistance each load cell 52 has (which depends upon the particular load cells 52 that are selected for use in person support apparatus 20). Inside of each load cell 52 is a Wheatstone bridge 74 (as discussed above) that includes four resistance values 76a-d. In a typical configuration, the value of three of those resistance values 76a-d is known, while the value of the fourth one is variable based upon the amount of strain applied to the load cell. In other words, the one or more strain gauges inside of the load cell 52 are typically arranged to occupy the leg of the Wheatstone bridge 74 having an unknown and variable resistance value. When no force is applied to the strain gauges, the resistances from the other three resistors 76 are configured such that the Wheatstone bridge is in balance and there is substantially no voltage difference between activation leads 64. (In some cases, a voltage may be present, but this can be accounted for via calibration, as will be discussed more below).

When a force is applied to the load cell, the value of the resistance in one leg of the Wheatstone bridge 74 changes in an amount that is correlated in a known manner to the amount of the applied force. This change in the resistance causes a change in the voltage drop between the activation leads 64, which will, in turn, change the amount of current flowing from a first one of the activation leads 64 to the second one of the activation leads 64. Further, the change in current between the two activation leads 64 of an individual load cell 52 causes a change in the current flowing through sense resistor 70. However, as mentioned above, this change in electrical current will be relatively small. In some embodiments, the collective difference in current through the activation leads 64 of all four load cells 52 when they have no force applied to them and when they have their maximum force applied to them is on the order of between 1-10 microamperes. In contrast, in some embodiments, when one or more of the load cells 52 is in an error state, the current flowing through sense resistor 70 to the load cells 52 will change in an amount ranging from 5-30 milliamperes. (It will be understood that the ranges of these microamp and milliamp changes are merely illustrative of some embodiments, and that other changes are possible in different embodiments). Regardless of the specific values, however, the change in current due to an error state will be at least an order of magnitude different from the change in current due to changing loads applied to the load cells.

Controller 56 is therefore programmed with the normal current value that is expected to flow through resistor 70 when there are no error states, and periodically compares readings of the actual current flowing through resistor 70 with the normal current value. If there is a deviation that is sufficiently large to indicate that a load cell 52 is in an error state, controller 56 proceeds to identify which of the four load cells is in the error state. This identification process is accomplished through the use of switches 72a-d.

More specifically, when controller 56 determines that one or more of the load cells 52 are in an error state due to the current flowing through resistor 70 having changed by greater than a threshold amount, controller 56 keeps switch 72a closed while opening switches 72b-d. In this configuration of switches 72, current through resistor 70 is only allowed to flow through load cell 52a. Controller 56 takes a measurement of the current flowing through resistor 70 in this configuration and compares it to a first stored expected current value that corresponds to the expected amount of current to flow through load cell 52a alone. This first expected current value is stored in a memory accessible to controller 56 and is determined during the design of the load cell system. If the comparison shows that the current through sense resistor 70 is within an acceptable range of the first stored expected current value, then controller 56 concludes that the first load cell 52a is functioning properly. If the comparison shows that the current through sense resistor 70 is outside of the acceptable range of the first stored expected current value, then controller 56 concludes that load cell 52a is not functioning properly and stores that information in memory, along with the value of the current flowing through first load cell 52a.

In at least one embodiment, controller 56 moves onto testing the second load cell 52b regardless of whether or not first load cell 52a was in an error state or not. That is, even if first load cell 52a was determined to be malfunctioning, controller 56 is configured in at least one embodiment to also test the other load cells 52b-d before sending an error message to user interface 60 and/or communications module 62. In order to test second load cell 52b, controller 56 closes second switch 72b while keeping first switch 72a closed (and third and fourth switches 72c and 72c open). This allows current from activation voltage source 68 to flow through both first and second load cells 52a and 52b (as well as through sense resistor 70). Controller 56 detects the amount of current flowing through resistor 70 and compares this current value with a second stored expected current value.

The second stored expected current value corresponds to an expected amount of current to flow through load cells 52a and 52b when activation source voltage 68 and load cells 52a and 52b are all functioning correctly. As with the first stored expected current value, this second expected current value is stored in a memory accessible to controller 56 and is determined during the design of the load cell system. If the comparison shows that the current through sense resistor 70 is within an acceptable range of the second stored expected current value, then controller 56 concludes that the second load cell 52b is functioning properly. If the comparison shows that the current through sense resistor 70 is outside of the acceptable range of the second stored expected current value, then controller 56 concludes that load cell 52b is not functioning properly and stores that information in memory, along with the value of the total current flowing through sense resistor 70 (which then flows through first and second load cells 52a and 52b).

As mentioned above, if controller 56 determines that the current flowing through first load cell 52a was outside of an acceptable range of the first stored expected current value, controller 56 stores the value of this incorrect current flow in memory. Further, controller 56 uses this incorrect current flow to adjust the second expected current flow when determining whether or not the second load cell 52b is in an error state or not. That is, in at least one embodiment, controller 56 calculates the resistance through first load cell 52a based upon the incorrect current flow through first load cells 52a (and sense resistor 70), uses this calculated resistance to determine the combined resistance of first and second load cells 52a and 52b when switch 72b is closed (using the known and stored expected resistance of second load cell 52b), and then, using this calculated resistance, determines if the current through sense resistor 70 matches what would be expected to flow therethrough when switches 72a and 72b are closed (and the rest are open). In this manner, even though first load cell 52a was determined to be in an error state, controller 56 is able to account for this error state to determine whether or not second load cell 52b is also in an error state.

Controller 56 continues in a similar manner to check the error states of load cells 52c and 52d by subsequently closing third switch 72c and comparing the current through sense resistor 70 to a third expected current value, and then closing the fourth switch 72d and comparing the current through sense resistor 70 to a fourth expected current value. Controller 56 is thereby able to not only detect that one or more of the load cells 52 are in an error state, but also to identify which ones of the load cells 52 are in an error state. After identifying the one or more load cells that are in an error state, controller 56 forwards this information to user interface 60 and/or off-board communications module 62 so that appropriate personnel are notified of the error state.

In an alternative embodiment, detection circuit 58a is modified so that each of switches 72a-d are arranged in parallel with each other and in series with a corresponding one of load cells 52 (e.g. switch 72a is in series with load cell 52a, switch 72b is in series with load cell 52b, etc.). In this alternative embodiment, controller 56 identifies which one (s) of the load cells are in an error state by closing the corresponding switch of only the one load cell that is being tested (e.g. closing switch 72c to test load cell 52c, while keeping the remaining switches 72a-b and d open). This allows controller 56 to more easily identify if multiple load cells are in an error state because the current through sense resistor 70 due to the error state of one load cell 52 can be isolated from the current flowing through sense resistor 70 when another load cell is tested. This isolation is achieved by opening the switch corresponding to the load cell that is in the error state while the other load cell is tested, thereby removing the load cell in the error state from the current flow.

Figure 5:
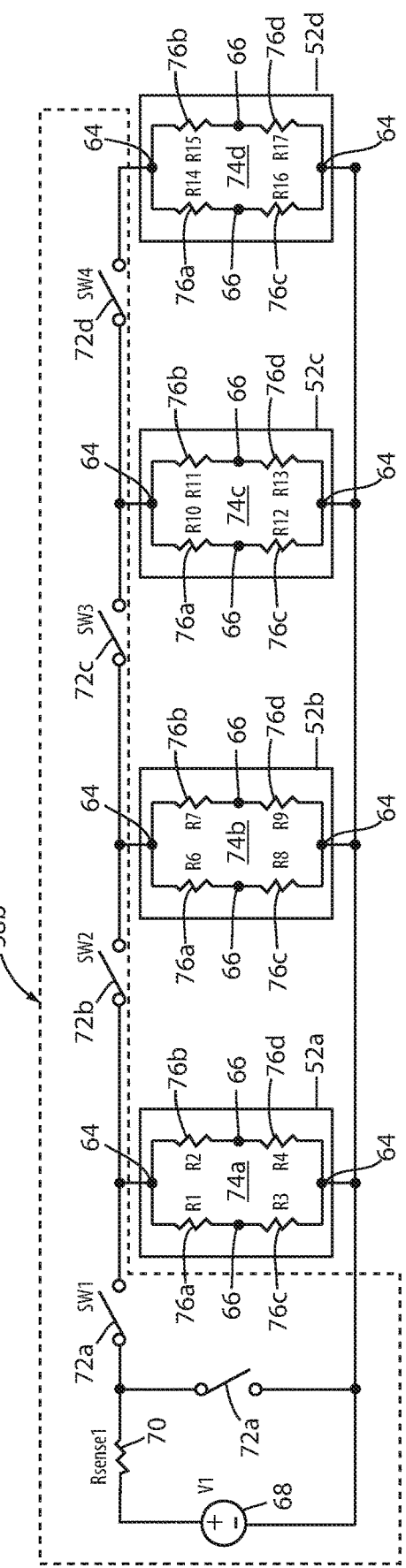
FIG. 5 is a block diagram of a second embodiment of a detection circuit that may be used with the load cell system of FIG. 3.

FIG. 5 illustrates an alternative detection circuit 58b. Detection circuit 58b of FIG. 5, like detection circuit 58a of FIG. 4, is adapted to detect the presence or absence of each load cell, as well as the status of each load cell 52 that is present. Further, detection circuit 58b is adapted to detect if activation voltage source 68 is in an error state. Those components of detection circuit 58b that are common to detection circuit 58a are numbered in FIG. 5 with the same numbers as in FIG. 4, and operate in the same manner as discussed above. Those components of detection circuit 58b that are not found in detection circuit 58a are provided with a new reference number and described in more detail below.

Detection circuit 58b differs from detection circuit 58a in that it includes a fifth switch 72e. Fifth switch 72e is operated under the control of controller 56 and is used to determine whether or not activation voltage source 68 is in an error state or not. Controller determines whether or not activation voltage source 68 is in an error state or not by opening switch 72a and closing switch 72e. In this configuration, current from activation voltage source 68 is only able to flow through sense resistor 70 and switch 72e. Because the value of sense resistor 70 is known to controller 56, and because activation voltage source 68 is designed to supply a substantially constant and known voltage, the expected value of the current flowing through sense resistor 70 is also known. More specifically, the expected value of the current flowing through sense resistor 70 when switch 72a is open and switch 72e is closed is stored in a memory accessible to controller 56. Controller 56 then reads the actual amount of current flowing through sense resistor 70 when switch 72a is open and switch 72e is closed and compares it to this stored expected value. If the value differs by more than a threshold, controller 56 determines that activation voltage source 68 is not supplying the expected constant voltage and is therefore in an error state. Controller 56 sends a message to user interface 60 and/or off-board communications module 62 that indicates that activation voltage source 68 is in an error state so that notification can be provided to appropriate personnel.

Controller 56 closes switch 72e in detection circuit 58b at selected times, but not during normal operation of the load cell system. That is, controller 56 does not close switch 72e when the outputs of load cells 52a-d (e.g. the voltages across sensor leads 66) are being monitored to determine whether forces are being applied to load cells 52a-d. Instead, controller 56 closes switch 72e and checks whether activation voltage source 68 is in an error state when the load cell system is initially powered, or at times when the load cells system is not being used (e.g. when the exit detection function is not armed and/or when a scale reading is not being taken). When the load cell system is being used to detect forces applied to the load cells 52a-d, controller 56 keeps switch 72e open and monitors the current through sense resistor 70 in the manner described above to determine if any of the load cells 52a-d are in an error state.

Figure 6:
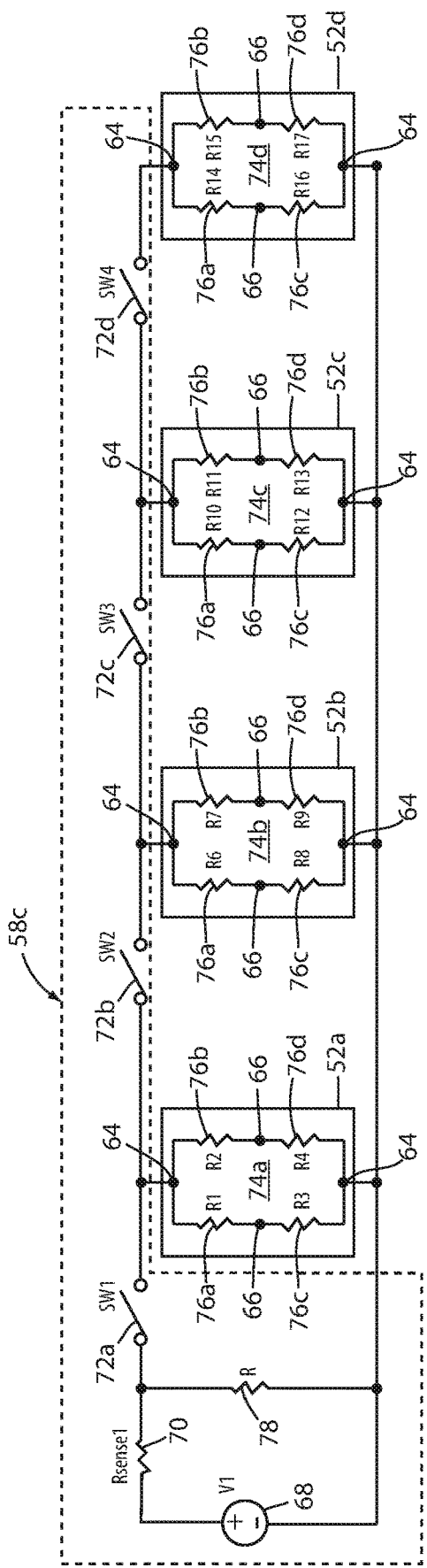
FIG. 6 is a block diagram of a third embodiment of a detection circuit that may be used with the load cell system of FIG. 3.

FIG. 6 illustrates another alternative detection circuit 58c. Detection circuit 58c of FIG. 6, like detection circuits 58a and 58b of FIGS. 4 and 5, is adapted to detect the presence or absence of each load cell, as well as the status of each load cell 52 that is present. Further, like detection circuit 58b, detection circuit 58c is adapted to detect if activation voltage source 68 is in an error state. Those components of detection circuit 58c that are common to detection circuits 58a or 58b are numbered in FIG. 6 with the same numbers as used with detection circuit 58a and/or 58b, and operate in the same manner as discussed above. Those components of detection circuit 58c that are not found in detection circuits 58a and/or 58b are provided with a new reference number and described in more detail below.

Detection circuit 58c differs from detection circuit 58b in that it includes a second resistor 78 instead of fifth switch 72e. Second resistor 78 is in parallel with each of the load cells 52 and in series with respect to the sense resistor 70. Controller 56 monitors the current flowing through sense resistor 70 in the same manner as described above with respect to detection circuit 58a. That is, controller 56 monitors the current flowing through sense resistor 70 at all times when the load cell system is in use, and compares the current flow through resistor 70 with an expected current flow. If the measured current flow deviates from the expected current flow by more than an acceptable tolerance, then controller 56 determines that there is an error state. However, unlike detection circuit 58a, which is not adapted to distinguish between an error state due to activation voltage source 68 and one due to one or more load cells 52, detection circuit 58c allows controller 56 to make this determination. This is accomplished as follows.

When controller 56 determines that an unexpected amount of current is flowing through sense resistor 70, it opens switch 72a and measures the current flowing through sense resistor 70 when switch 72a is opened. Controller 56 has access to a memory having stored therein an expected value of current to flow through sense resistor 70 when switch 72a is opened. This expected value is calculated during the design of the load cell system and is based upon the known expected value of activation voltage source 68 and the known resistance values of sense resistor 70 and second resistor 78. If the current flowing through sense resistor 70 when switch 72a is open deviates from the expected value by more than an acceptable tolerance, controller 56 determines that activation voltage source 68 is not supplying the expected constant voltage and is therefore in an error state. If the current flowing through sense resistor 70 when switch 72a is open does not deviate from the expected value by more than the tolerance, controller 56 determines that the previous unexpected current flow through sense resistor 70 while switch 72a was closed was due to an error in one or more load cells 52a-d, not due to activation voltage source 68. Controller 56 therefore then proceeds to close switch 72a and cycle through the steps described above to identify which of the four load cells 52a-d is in the error state.

Figure 7:
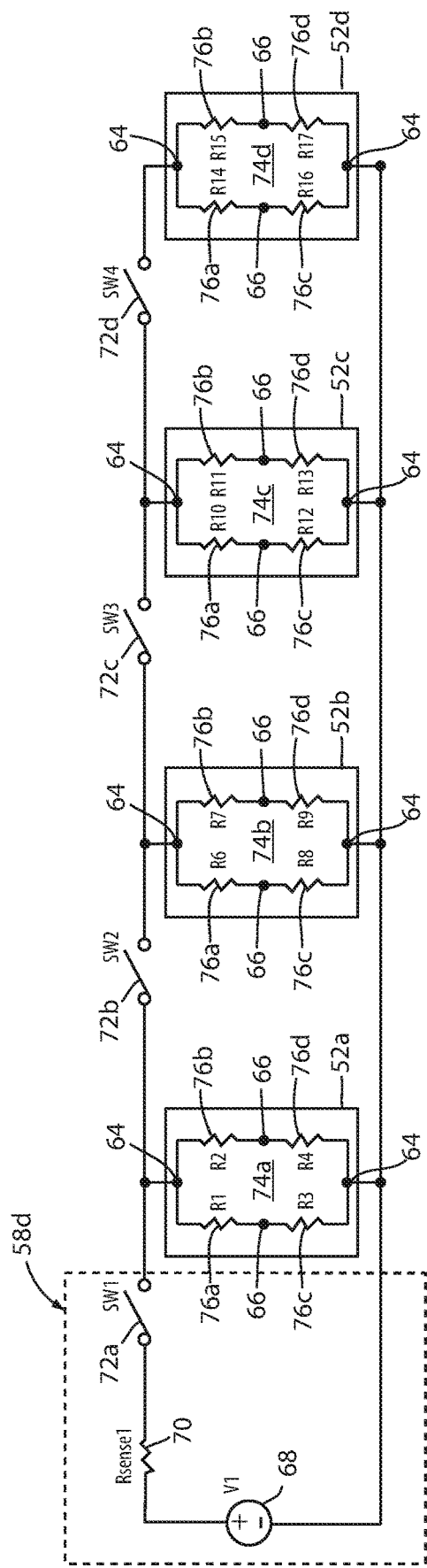
FIG. 7 is a block diagram of a fourth embodiment of a detection circuit that may be used with the load cell system of FIG. 3.

FIG. 7 illustrates another alternative detection circuit 58d. Detection circuit 58d operates substantially the same as detection circuit 58a of FIG. 4. That is, detection circuit 58d of FIG. 7, like detection circuit 58a of FIG. 4, is adapted to detect the presence or absence of each load cell, as well as the status of each load cell 52 that is present. However, unlike detection circuit 58a, detection circuit 58d, does not include switches 72b, 72c, and 72d. Detection circuit 58d therefore does not allow controller 56 to automatically identify which specific load cell 52 is in an error state. Instead, controller 56 is adapted to issue an alert when the current through sense resistor 70 deviates from an expected value by more than a threshold, and leave it up to appropriate personnel to determine which specific one (or ones) of the load cells 52a-d is in an error state.

In some embodiments, detection circuit 58d may be further modified by removing switch 72a altogether. When so modified, controller 56 monitors the current through sense resistor 70 and issues an alert if the monitored current deviates by more than the tolerance from the expected value.

Figure 8:
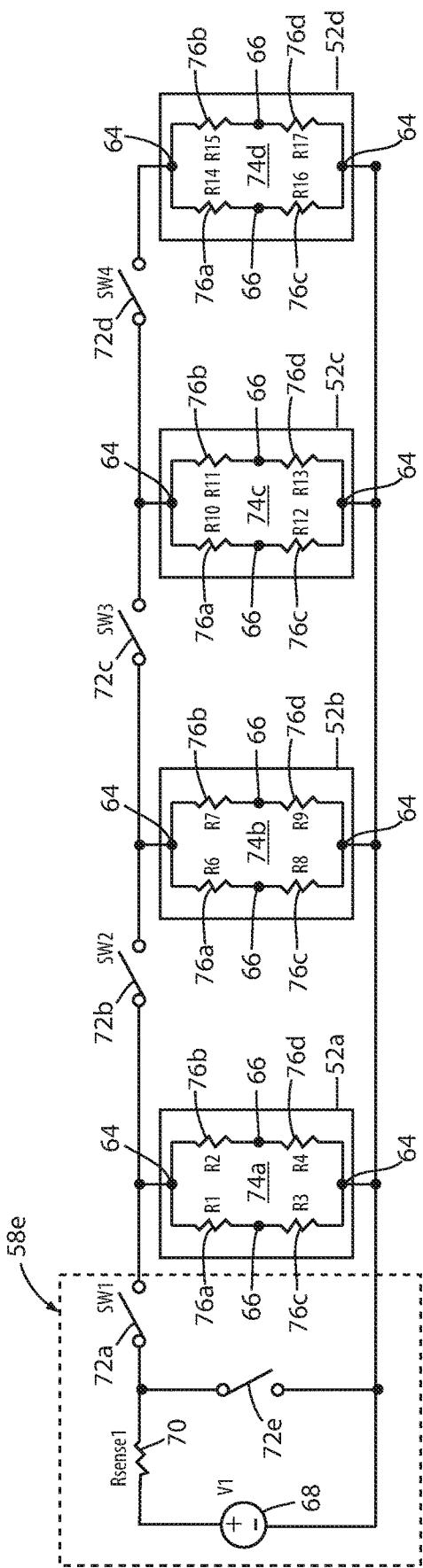
FIG. 8 is a block diagram of a fifth embodiment of a detection circuit that may be used with the load cell system of FIG. 3.

FIG. 8 illustrates another alternative detection circuit 58e. Detection circuit 58e operates substantially the same as detection circuit 58b of FIG. 5. That is, detection circuit 58e of FIG. 8, like detection circuit 58b of FIG. 5, is adapted to detect the presence or absence of each load cell, the status of each load cell 52 that is present, and whether activation voltage source 68 is in an error state or not. However, unlike detection circuit 58b, detection circuit 58e does not include switches 72b, 72c, and 72d. Detection circuit 58e therefore does not allow controller 56 to automatically identify which specific load cell 52 is in an error state. Instead, controller 56 is adapted to issue an alert when the current through sense resistor 70 deviates from an expected value by more than a threshold, and leave it up to appropriate personnel to determine which specific one (or ones) of the load cells 52a-d is in an error state. Controller 56 also issues an alert if it detects an error state with respect to activation voltage source 68 (which, as with detection circuit 58b, is detected by closing switch 72e and opening switch 72a).

Figure 9:
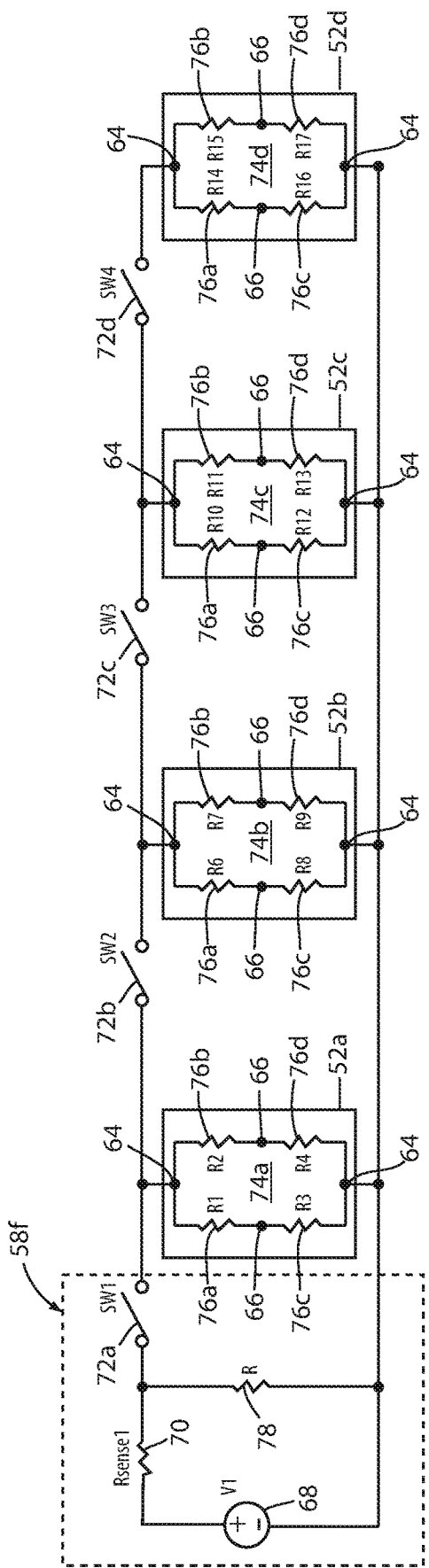
FIG. 9 is a block diagram of a sixth embodiment of a detection circuit that may be used with the load cell system of FIG. 3.

FIG. 9 illustrates another alternative detection circuit 58f. Detection circuit 58f operates substantially the same as detection circuit 58c of FIG. 6. That is, detection circuit 58f of FIG. 9, like detection circuit 58c of FIG. 6, is adapted to detect the presence or absence of each load cell, the status of each load cell 52 that is present, and whether activation voltage source 68 is in an error state or not. However, unlike detection circuit 58c, detection circuit 58f does not include switches 72b, 72c, and 72d. Detection circuit 58f therefore does not allow controller 56 to automatically identify which specific load cell 52 is in an error state. Instead, controller 56 is adapted to issue an alert when the current through sense resistor 70 deviates from an expected value by more than a threshold, and leave it up to appropriate personnel to determine which specific one (or ones) of the load cells 52a-d is in an error state. Controller 56 also issues an alert if it detects an error state with respect to activation voltage source 68 (which, as with detection circuit 58c, is detected by opening switch 72a).

In all of the detection circuits above, it will be understood that switches 72a-e can be implemented in a variety of different manners. As noted, in one embodiment, switches 72a-e are MOSFETs that are controlled by controller 56. In other embodiments, switches 72a-e are implemented using other types of transistors, or implemented using relays. Still other types of switching may be implemented. In still other embodiments, one or a combination of switches 72b, 72c and 72d is added or removed from the circuit to achieve similar function as mentioned above.

Figure 10:
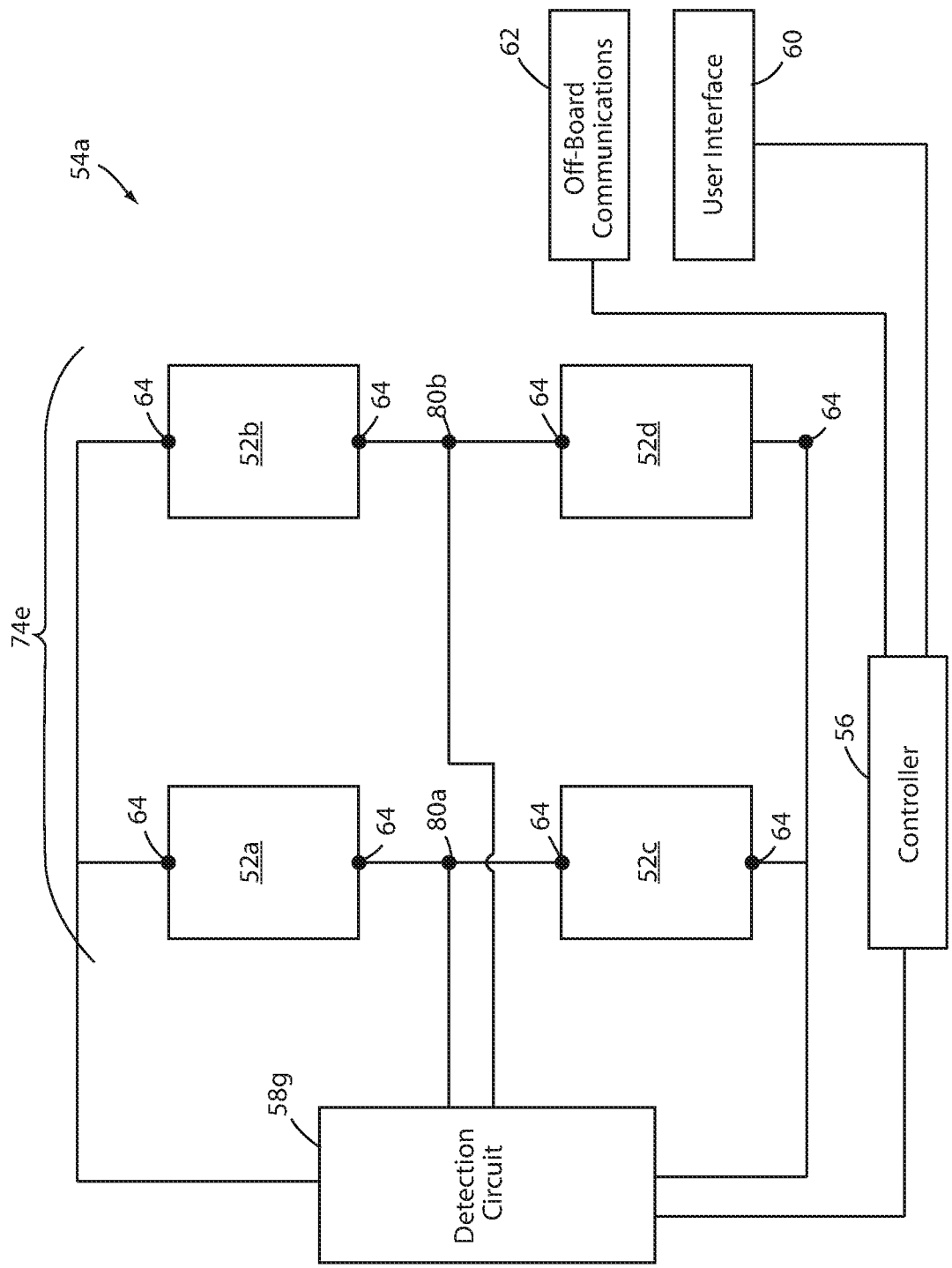
FIG. 10 is a block diagram of a load cell system according to a second embodiment that may be incorporated into the person support apparatus of FIG. 1, as well as other person support apparatuses.

FIG. 10 illustrates another alternative load cell system 54a. Load cell system 54a may be used with any of the person support apparatuses described herein. Those components of load cell system 54a that are common to load cell system 54 are numbered with the same reference numbers. Those components of load cell system 54a that are not found in load cell system 54, or that are modified from load cell system 54, are provided with a new or modified reference number and described in more detail below. For purposes of clarity, the connections between controller 56 and each of the sensor leads 66 have not been shown. However, it will be understood that such electrical connections exist and are used by controller 56 in the same manners previously described.

Load cell system 54a differs from load cell system 54 in that it includes a detection circuit 58g that is applied to load cells that are arranged in a Wheatstone bridge configuration, rather than in parallel to each other (as with detection circuits 58a-f). Detection circuit 58g operates to detect the presence or absence of each load cell, the status of each load cell 52 that is present, and whether activation voltage source 68 is in an error state or not. Although not visible in FIG. 10, detection circuit 58g includes an internal sense resistor 70 and a substantially constant activation voltage source 68. Detection circuit 58g operates in conjunction with four load cells 52a-d that are collectively arranged as a Wheatstone bridge 74e. That is, load cell 52a is positioned in a first leg of bridge 74e; load cell 52b is positioned in a second leg of bridge 74e, third load cell 52c is positioned in a third leg of bridge 74*e*; and fourth load cell 52*d* is positioned in a fourth leg of bridge 74*e*. The activation voltage source of detection circuit 58*g* supplies a substantially constant voltage to first activation leads 64 of load cells 52*a* and 52*b*. The second activation leads 64 of first and second load cells 52*a* and 52*b* are coupled to the first activation leads 64 of third and fourth load cells 52*c* and 52*d*. The second activation leads 64 of third and fourth load cells 52*c* and 52*d* are coupled to ground (and/or back to detection circuit 58*g*).

Detection circuit 58*g* monitors the amount of current flowing through its sense resistor 70 during normal operation of the load cells 52*a*-*d*. This measured amount of current should be substantially constant, although it will have minor variations caused by the differing forces applied to the load cells 52. When detection circuit 58*g* determines that the current through the sense resistor has deviated from the expected current by more than an acceptable tolerance, it concludes that one of the four load cells is in an error state.

Detection circuit 58*g* also detects the voltage between midpoints 80*a* and 80*b* of the Wheatstone bridge 74*e* and forwards this voltage measurement to controller 56. In at least one embodiment, controller 56 compares the voltage between midpoints 80*a* and 80*b* when no load is being applied to the load cells 52 and a stored, expected no-load voltage value. The stored, expected no-load value is determined during the design and/or manufacturing of the person support apparatus 20 by measuring the voltage across midpoints 80*a* and 80*b* when no load is present and all of the load cells 52*a*-*d* are known to be working properly. In at least one embodiment, this stored, expected no-load voltage value is substantially zero volts. If the measured voltage between midpoints 80*a* and 80*b* deviates from this stored, expected no-load voltage by more than an acceptable tolerance, then controller 56 concludes that one or more of the load cells 52*a*-*d*, or the activation voltage source 68, in is an error state. In at least one embodiment, if controller 56 determines that the current flowing through the sense resistor 70 is within the acceptable tolerance of its expected value, but that the voltage between midpoints 80*a* and 80*b* during a no-load situation deviates from its expected value by more than an acceptable threshold, then controller 56 concludes that activation voltage source 68 is in an error state.

The arrangement of load cells 52*a*-*d* in a Wheatstone bridge configuration therefore enables controller 56 to determine whether or not activation voltage source 68 is in an error state without the use of any switches. This is accomplished in one embodiment by designing the load cell system such that load cells 52*a*-*d*, during a no-load, no-error state configuration, have resistances that are balanced in the Wheatstone bridge 74*e*. When so balanced, substantially no voltage exists between midpoints 80*a* and 80*b*. Therefore, if controller 56 detects a voltage between midpoints 80*a* and 80*b* during a no-load moment, controller 56 concludes that an error state exists in one or more of the load cells 52 and/or with activation voltage source 68. Further, as noted above, if controller 56 detects that the current through the sense resistor 70 deviates from its expected value by more than an acceptable threshold, then controller 56 concludes that the error state is due to activation source voltage 68, rather than one or more individual load cells 52.

Although the foregoing operation has been primarily described with respect to a no-load situation, it will be understood that it may apply equally to any load situation where the applied load value is known and measurements of the voltage between points 80*a* and 80*b* during that known load were taken and recorded at a time when the load cell system was functioning properly. In such situations, controller 56 compares the voltage detected between midpoints 80*a* and 80*b* with the previously recorded measurements taken when no error state existed. If they differ by more than a threshold, controller 56 determines that an error state exists.

In at least one embodiment, user interface 60 is adapted to allow a suitable person, such as a technician, to input information to controller 56 that indicates that no load is being applied to the load cells 52. When such information is input, controller 56 takes measurements of the voltage between midpoints 80*a* and 80*b* and compares them to their expected value to see if an error state exists. User interface 60 may also be adapted to allow the technician, or other authorized personnel, to input information that identifies the specific value of a load being applied to load cells 52. For example, the technician may place one or more known weights on the load cells system and inform controller 56 of the amount of this weight via user interface 60. Controller 56 then compares the measured voltage between midpoints 80*a* and 80*b* with the expected voltage for the input weight and issues an error message if there is a deviation.

Figure 11:
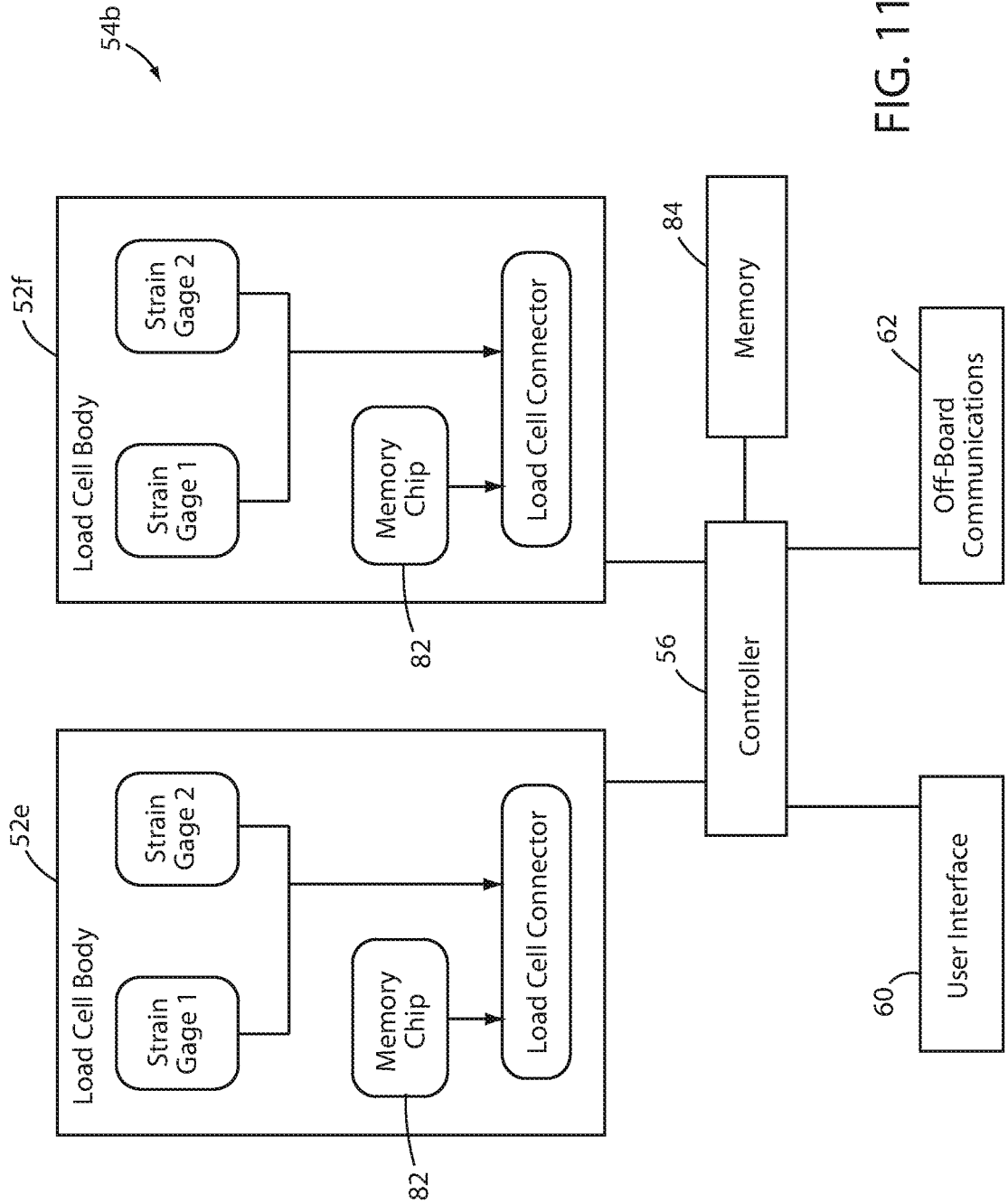
FIG. 11 is a block diagram of a load cell system according to a third embodiment that may be incorporated into the person support apparatus of FIG. 1, as well as other person support apparatuses.

FIG. 11 depicts an another alternative load cell system 54*b* that may be used with any of the person support apparatuses described herein. Those components of load cell system 54*b* that are common to load cell systems 54 and/or 54*a* are numbered with the same reference numbers. Those components of load cell system 54*b* that are not found in load cell systems 54 or 54*a*, or that are modified from load cell systems 54 or 54*a*, are provided with a new or modified reference number and described in more detail below.

Load cell system 54*b* differs from load cell systems 54 and 54*a* in that it includes load cells 52*e* and 52*f* that are configured differently from load cells 52*a*-*d*. More specifically, load cells 52*e* and 52*f* are configured to include an internal load cell memory 82. Load cell memory 82 includes calibration data stored therein that is specific to each load cell 52*e* and 52*f*. Such calibration data includes one or more of the following items: a Y value ($E_{MAX}/V_{MIN}$), rate output (e.g. mV/V), creep (over a given time period), temperature effect on output, temperature effect on zero, input impedance, output impedance, etc. All of the calibration values that are stored in memory 82 are specific to a particular load cell, and may be different for different load cells. Memory 82 is adapted to be read by an external controller that is not part of the load cells 52*e* or 52*f*, such as, controller 56.

Controller 56 uses the stored calibration values within a particular load cell memory 82 to convert the voltage outputs from the sensor leads 66 of that particular load cell into an accurate weight value. By including this calibration data within load cell memory 82, it is not necessary for a user to manually program this information into the code executed by controller 56, or otherwise manually enter this information. Instead, controller 56 can read this information automatically and input it into its weight determining algorithm without requiring further human input. Including this calibration data within the load cell memory 82 also helps avoid mistakes being made during the manufacturing or configuration of person support apparatus 20 wherein calibration data for a particular load cell 52 is entered for the wrong load cell. In other words, mismatches between a load cell and its specific calibration data are avoided by including this calibration data in a memory that is physically integrated into the load cells 52*e* and/or 52*f*.

The load cell calibration data contained with load cell memories 82 is loaded into memories 82 either by the manufacturer of the load cell 52, or by a testing entity (e.g.

an agency, contractor, laboratory, etc.) that performs testing on the load cells after the load cells have been manufactured. In some embodiments, the load cells 52 are manufactured without a memory, and both the memory and the calibration data are added to the load cell 52 after the calibration data is gathered through sufficient testing. The manner in which the memory 82 is secured to the load cell may vary so long as it is difficult for the memory to become physically disassociated from the corresponding load cell.

As shown in FIG. 11, load cell system 54b also includes a person support apparatus memory 84 that is positioned on board person support apparatus 20 and in communication with controller 56. Person support apparatus memory 84 is separate from load cell memories 82. That is, person support apparatus memory 84 remains with person support apparatus 20 when load cells 52e and/or 52f are removed or replaced. Person support apparatus memory 84 stores calibration data for the load cells 52e and 52f that is specific to the person support apparatus 20. That is, after load cells 52e and 52f are installed on person support apparatus 20, known forces are applied to the load cell system and the values measured by each load cell 52e and 52f are recorded in person support apparatus memory 84. These values take into account the manners in which the load cells 52e and 52f react to forces applied to them after they have been integrated into a person support apparatus 20, which may be different from how they react to forces applied on a test bench, or in some other environment outside of a particular person support apparatus 20.

Controller 56 uses the load cell calibration data stored in memory 84, along with the calibration data stored in load cell memories 82, when converting the outputs of load cells 52e and 52f into force measurements. Further, when a particular load cell 52 has to be replaced, controller 56 is adapted, in at least one embodiment, to use the calibration data from the load cell memory 82 of the replacement load cell 52 in combination with the calibration data from the person support apparatus memory 84 to process the outputs from the replacement load cell. Controller 56 does this without requiring additional calibration tests to be run on the person support apparatus 20 after the replacement load cell has been installed. That is, once the calibration data that is specific to the person support apparatus 20 is determined and stored in memory 84, controller 56 uses this patient support apparatus-specific data with any future replacement load cells such that the process of applying known weights to the load cell system with the replacement load cells and recording their outputs does not have to be performed.

Although not illustrated in FIG. 11, it will be understood that load cell system 54b can be modified to include any one or the various detection circuits 58a-g discussed above so that controller 56 can detect error states of the one or more load cells 52e-f, and/or of the activation voltage source. Further, it will be understood that, although load cell system 54b is shown in FIG. 11 with only two load cells, its functions and features can be applied to load cell systems having different numbers of load cells. Similarly, although load cell systems 54 and 54a have been illustrated herein as including four load cells, the functions and features of these systems can be applied to load cell systems having different numbers of load cells.

In some embodiments of load cell system 54b, controller 56 transfers the data stored within each load cell memory 82 to the person support apparatus memory 84. The person support apparatus memory 84 then contains two subsets of calibration data for each load cell: a first subset that is specific to the individual load cell, and a second subset that is specific to the person support apparatus 20. As noted, controller 56 uses both of these subsets when converting the voltage outputs from the load cells into weight or force readings.

Although load cells 52e and 52f are the only load cells shown and described herein as containing load cell memories 82 having calibration data stored therein, it will be understood that any of load cells 52a-d that are used in load cell system 54 and 54a could be modified to include load cell memories 82 with calibration data stored therein, and that any of the detection circuits 58, 58a-58g can be used with load cells having load cell memories 82 with calibration data stored therein.

It will also be understood by those skilled in the art that, although the load cell systems discussed herein have primarily been described with respect to a scale and/or exit detection system of a person support apparatus 20, the load cell systems described herein can also be applied to load cells that are used on person support apparatuses 20 for other purposes. For example, any of the features of the load cell system described herein can alternatively be used with one or more load cells that are used in conjunction with a self-propulsion system that may be built into the person support apparatus. Two examples of such self-propulsion systems are disclosed in commonly assigned U.S. Pat. No. 6,772,850, issued to Waters et al. and entitled POWER ASSISTED WHEELED CARRIAGES, as well as U.S. patent publication 2014/0076644 published Mar. 20, 2014 by inventors Richard Derenne et al. and entitled POWERED PATIENT SUPPORT APPARATUS, the complete disclosures of both of which are hereby incorporated herein by reference.

It will also be understood by those skilled in the art that controller 56 may be programmed, in any of the load cell system described herein, to also monitor the voltages detected between sensor leads 66 to determine whether or not a load cell is in an error state. That is, if a load cell 52 generates a voltage between sensor leads 66 that corresponds to a weight value that is outside of the expected or designed range of acceptable weight values, then controller 56 is programmed to conclude that the load cell is in an error state. The error state detected by examining the voltage between sensor leads 66 may not necessarily be detectable as an error state by examining the voltage between activation leads 64, or vice versa. By programming controller 56 to monitor the voltages across both the activation leads 64 and the sensor leads 66, controller 56 may be able to more robustly detect error states with one or more of the load cells 52 and/or the activation voltage source 68.

Still further, it will be understood by those skilled in the art that, although FIG. 11 depicts load cells 52e and 52f as containing two strain gauges each, the number of strain gauges within a particular load cell 52 can vary. That is, the principles disclosed herein are also applicable to load cells having only a single strain gauge and/or to load cells having more than two strain gauges.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A person support apparatus comprising:
a frame;
a load cell supported by the frame;
a support surface adapted to support thereon an occupant of the person support apparatus, the support surface being supported by the load cell such that a weight of the occupant is at least partially detectable by the load cell when the occupant is positioned on the support surface;
a load cell memory physically coupled to the load cell, the load cell memory including first calibration data regarding the load cell stored therein, the first calibration data generated before the load cell is installed in the person support apparatus;
a person support apparatus memory containing second calibration data regarding the load cell, the second calibration data generated after the load cell is installed in the person support apparatus; and
a controller in communication with the load cell, the load cell memory, and the person support apparatus memory, the controller adapted to read the first calibration data from the load cell memory, to read the second calibration data from the person support apparatus memory, and to use the first and second calibration data to determine an amount of weight applied to the support surface.

2. The person support apparatus of claim 1 wherein the person support apparatus is one of a bed, a recliner, a cot, and a stretcher.

3. The person support apparatus of claim 2 wherein the controller is further adapted to use the second calibration data to calibrate a replacement load cell when the replacement load cell is installed in the person support apparatus that replaces the load cell.

4. The person support apparatus of claim 3 wherein the controller is adapted to not use the first calibration data when the replacement load cell is installed in the person support apparatus.

5. The person support apparatus of claim 3 wherein the controller calibrates the replacement load cell without requiring any calibration measurements to be taken regarding the replacement load cell after the replacement load cell is installed in the person support apparatus.

6. The person support apparatus of claim 4 wherein the replacement load cell includes a replacement load cell memory in which third calibration data regarding the replacement load cell is stored, and the controller is further adapted to read the third calibration data from the replacement load cell memory and to use the third and second calibration data to determine the amount of weight applied to the support surface.

7. The person support apparatus of claim 1 wherein the first calibration data includes at least one of the following: a rate output, a creep value, a temperature effect on output value, a temperature effect on zero value, an input impedance, an output impedance, and a maximum capacity value.

8. The person support apparatus of claim 7 wherein the second calibration data includes data generated from at least one force applied to the load cell after the load cell is installed in the person support apparatus.

9. The person support apparatus of claim 1 wherein the first calibration data is particular to the load cell, and the second calibration data is particular to the person support apparatus.

10. The person support apparatus of claim 1 further comprising:
a second load cell including a second load cell memory physically coupled to the second load cell, the second load cell memory including third calibration data;
a third load cell including a third load cell memory physically coupled to the third load cell, the third load cell memory including fourth calibration data;
a fourth load cell including a fourth load cell memory physically coupled to the fourth load cell, the fourth load cell memory including fifth calibration data; and
wherein the controller is further adapted to read the third calibration data, fourth calibration data, and fifth calibration data from the second load cell memory, third load cell memory, and fourth load cell memory, respectively, and to use the third, fourth, and fifth calibration data along with the first and second calibration data to determine the amount of weight applied to the support surface.

11. The person support apparatus of claim 10 wherein the third calibration data is particular to the second load cell, the fourth calibration data is particular to the third load cell, and the fifth calibration data is particular to the fourth load cell.

12. The person support apparatus of claim 11 further comprising a detection circuit in communication with the load cell, the second load cell, the third load cell, and the fourth load cell, wherein the controller is further adapted to determine if any one or more of the load cells are in an error state based upon information from the detection circuit and to output an error signal if any one or more of the load cells are in the error state.

13. The person support apparatus of claim 12 wherein the error state comprises any one or more of the load cells not being electrically coupled to an activation power source.

14. The person support apparatus of claim 12 wherein each one of the load cells includes a first set of leads for powering the respective load cell and a second set of leads for outputting a signal that varies as a function of a physical load applied to the respective load cell, wherein the detection circuit is in communication with the first set of leads of each load cell but not the second set of leads.

15. The person support apparatus of claim 14 wherein the detection circuit detects changes in a total amount of electrical current supplied to all of the first sets of leads to an activation power source.

16. The person support apparatus of claim 15 wherein the controller determines that one or more of the load cells are not electrically coupled to the activation power source if the total amount of electrical current supplied to all of the first sets of leads is outside of a predetermined range.

17. The person support apparatus of claim 16 wherein the predetermined range is a function of how many load cells are incorporated into the person support apparatus.

18. The person support apparatus of claim 14 wherein the detection circuit detects changes in electrical current for each of the first sets of leads.

19. The person support apparatus of claim 10 further comprising:
a first Wheatstone bridge including the load cell and the second load cell;

a second Wheatstone bridge including the third load cell and the fourth load cell;

a third Wheatstone bridge including both the first and second Wheatstone bridges; and wherein the controller is in communication with the first, second, and third Wheatstone bridges, and the controller is adapted to monitor voltages between midpoints of each of the first, second, and third Wheatstone bridges.

20. The person support apparatus of claim 19 wherein the controller uses a voltage between the midpoints of the first Wheatstone bridge and a voltage between the midpoints of the second Wheatstone bridge to determine the weight applied to the support surface, and the controller uses a voltage between the midpoints of the third Wheatstone bridge to determine if an error state exists for at least one of the load cells when no weight is applied to the support surface.

* * * * *